United States Patent
Hutton et al.

(10) Patent No.: US 9,424,070 B2
(45) Date of Patent: Aug. 23, 2016

(54) COMBINING SCALABILITY ACROSS MULTIPLE RESOURCES IN A TRANSACTION PROCESSING SYSTEM HAVING GLOBAL SERIALIZABILITY

(71) Applicant: Open Cloud NZ Ltd, Wellington (NZ)

(72) Inventors: Matthew Bennet Hutton, Wellington (NZ); Oliver Tostig Benjamin Jowett, Cambridge (GB); David Ian Ferry, Cambridge (GB)

(73) Assignee: OPEN CLOUD LIMITED, Cambridge (GB)

( * ) Notice: Subject to any disclaimer, the term of this patent is extended or adjusted under 35 U.S.C. 154(b) by 0 days.

(21) Appl. No.: 14/410,892

(22) PCT Filed: Jun. 18, 2013

(86) PCT No.: PCT/GB2013/051581
§ 371 (c)(1),
(2) Date: Dec. 23, 2014

(87) PCT Pub. No.: WO2014/013220
PCT Pub. Date: Jan. 23, 2014

(65) Prior Publication Data
US 2015/0193264 A1    Jul. 9, 2015

Related U.S. Application Data

(60) Provisional application No. 61/673,135, filed on Jul. 18, 2012.

(30) Foreign Application Priority Data

Jul. 18, 2012 (GB) .................................. 1212756.9

(51) Int. Cl.
*G06F 3/00* (2006.01)
*G06F 9/44* (2006.01)
(Continued)

(52) U.S. Cl.
CPC ................. *G06F 9/466* (2013.01); *G06F 9/54* (2013.01)

(58) Field of Classification Search
None
See application file for complete search history.

(56) References Cited

U.S. PATENT DOCUMENTS

| 7,509,370 B1 | 3/2009 | Branda et al. |
| 2005/0097555 A1 | 5/2005 | Tuel |

(Continued)

OTHER PUBLICATIONS

Search Report for corresponding GB Application No. 1212756.9, dated Nov. 15, 2012, 3 pgs.
International Search Report and Written Opinion for corresponding PCT Application No. PCT/GB2013/051581, dated Oct. 11, 2013 (10 pgs.).

(Continued)

*Primary Examiner* — Craig Dorais
(74) *Attorney, Agent, or Firm* — Shumaker & Sieffert, P.A.

(57) ABSTRACT

There is disclosed a method and system for processing transactions requested by an application in a distributed computer system. The computer system includes at least one resource comprising a plurality of storage areas each with an associated resource manager, or a plurality of resources each comprising at least one storage area with an associated resource manager, the storage areas holding the same tables as each other. There is also provided a transaction manager that is linked, by way of either a network or a local application programming interface (API), to each of the resource managers, the transaction manager being configured to coordinate transaction prepare and commit cycles. The application requests operations on the resource by way of an interface; and a dispatch function directs transactions from the application to the appropriate storage areas on the basis of the content of the tables in the resource managers, in such a way that any given transaction is routed only to the storage areas containing entries upon which the transaction operates, allowing another transaction operating on different entries to be routed concurrently in parallel to other storage areas. A safe timestamp manager is provided to allocate new timestamps for committing transactions when such transactions access more than one resource storage area at the same time.

48 Claims, 13 Drawing Sheets

(51) Int. Cl.
*G06F 9/46* (2006.01)
*G06F 13/00* (2006.01)
*G06F 9/54* (2006.01)

(56) References Cited

U.S. PATENT DOCUMENTS

| | | | |
|---|---|---|---|
| 2006/0015485 A1* | 1/2006 | Hofmann | G06F 17/30575 |
| 2009/0287703 A1 | 11/2009 | Furuya | |
| 2012/0102006 A1 | 4/2012 | Larson et al. | |
| 2012/0167098 A1 | 6/2012 | Lee et al. | |
| 2014/0330767 A1* | 11/2014 | Fowler | G06F 9/466 707/607 |

OTHER PUBLICATIONS

Sebastiano Peluso et al., "When Scalability Meets Consistency: Genuine Multiversion Update-Serializable Partial Data Replication," Jun. 18, 2012, Distributed Computing Systems, 2012 IEEE 32nd International Conference on, pp. 455-465, XP032217888.

Jason Baker et al., "Megastore: Providing Scalable, Highly Available Store for Interactive Services," Jan. 12, 2011, Internet: URL: http://pdos.csail.mit.edu/6.824-212/papers/jbaker-megastore.pdf. XP002713904.

Hany E. Ramadan et al., "Dependence-Aware Transactional Memory for Increased Concurrency," Nov. 8, 2008, Microarchitecture, Micro-41, 2008 41st IEEE/ACM International Symposium on, IEEE, Piscataway, NJ, pp. 246-257, XP031442411.

* cited by examiner

COMBINING SCALABILITY ACROSS MULTIPLE RESOURCES IN A TRANSACTION PROCESSING SYSTEM HAVING GLOBAL SERIALIZABILITY

This application is a national stage entry under 35 U.S.C. §371 of PCT Application No. PCT/GB2013/051581, filed Jun. 18, 2013, which claims the benefit of Great Britain Application No. 1212756.9, filed Jul. 18, 2012 and U.S. Application No. 61/673,135, filed Jul. 18, 2012. The entire contents of each of PCT Application No. PCT/GB2013/051581, Great Britain Application No. 1212756.9 and U.S. Application No. 61/673,135 are incorporated herein by reference.

This invention relates to a method and system for processing transactions in a distributed computer system that conforms to global serializability, and which makes use of scalability across multiple resources.

BACKGROUND

A distributed database is a database in which storage devices are not all attached to a common CPU. It may be stored in multiple computers located in the same physical location, or may be dispersed over a network of interconnected computers.

Collections of data (e.g. in a database) can be distributed across multiple physical locations. A distributed database can reside on network servers on the Internet, on corporate intranets or extranets, or on other company networks. The replication and distribution of databases improves database performance at end-user worksites.

To ensure that the distributive databases are up to date and current, there are two processes: replication and duplication. Replication involves using specialized software that looks for changes in the distributive database. Once the changes have been identified, the replication process makes all the databases look the same. The replication process can be very complex and time consuming depending on the size and number of the distributive databases. This process can also require a lot of time and computer resources. Duplication on the other hand is not as complicated. It basically identifies one database as a master and then duplicates that database. The duplication process is normally done at a set time after hours. This is to ensure that each distributed location has the same data. In the duplication process, changes to the master database only are allowed. This is to ensure that local data will not be overwritten. Both of the processes can keep the data current in all distributive locations.

Besides distributed database replication and fragmentation, there are many other distributed database design technologies. For example, local autonomy, synchronous and asynchronous distributed database technologies. The implementation of these technologies can and does depend on the needs of the business and the sensitivity/confidentiality of the data to be stored in the database, and hence the price the business is willing to spend on ensuring data security, consistency and integrity.

Multi-version concurrency control (MCC or MVCC), in the database field of computer science, is a concurrency control method commonly used by database management systems to provide concurrent access to the database and in programming languages to implement transactional memory.

For instance, a database will implement updates not by deleting an old piece of data and overwriting it with a new one, but instead by marking the old data as obsolete and adding the newer version. Thus there are multiple versions stored, but only one is the latest. This allows the database to avoid overhead of filling in holes in memory or disk structures but requires (generally) the system to periodically sweep through and delete the old, obsolete data objects. For a document-oriented database it also allows the system to optimize documents by writing entire documents onto contiguous sections of disk—when updated, the entire document can be re-written rather than bits and pieces cut out or maintained in a linked, non-contiguous database structure.

MVCC also provides potential point in time consistent views. In fact, read transactions under MVCC typically use a timestamp or transaction ID to determine what state of the DB to read, and read these versions of the data. This avoids managing locks for read transactions because writes can be isolated by virtue of the old versions being maintained, rather than through a process of locks or mutexes. Writes affect future version but at the transaction ID that the read is working at, everything is guaranteed to be consistent because the writes are occurring at a later transaction ID.

In other words, MVCC provides each user connected to the database with a snapshot of the database for that person to work with. Any changes made will not be seen by other users of the database until the transaction has been committed.

FIG. 1 shows a known system in which transactions or changes to entries in the Resources resulting from operations of the Application, are controlled by a Transaction Manager (TM) or Transaction Co-ordinator and multiple Resource Managers (RMs). The TM co-ordinates multiple RMs into a single "global" transaction. The Application communicates with each Resource and also with the TM. This may be by way of APIs, and/or a query language, and/or a protocol. For present purposes, we shall refer to the interface between the Application and the Resources (and the TM) simply as an interface, although it will be understood that the term interface encompasses one or more of APIs, and/or a query language, and/or a protocol. The Application may be considered as a program that uses and manipulates the entries in the Resources.

Another way of looking at a known database system is shown in FIG. 2. A Resource in this context is a system or component that participates in a transaction processing system. A database may be considered as a typical Resource. The Resource in FIG. 2 may, at its simplest, be considered as a storage area that is managed by an RM. The RM is simply an interface exposed by a transacted Resource to the TM. The RM allows the TM to coordinate transaction boundaries across multiple Resources. Multiple RMs may be present in a single Resource. The RM may perform operations such as prepare( ), commit( ) and rollback( ). These operations are invoked by the TM. The TM invokes the RMs, and is only concerned with managing the prepare/commit/rollback lifecycles for the various RMs used in its transactions. An Application can access the Resource by way of APIs, and/or a query language, and/or a protocol that interfaces between the Application and the Resource, and which allows the Application to ask the Resource to do something. Operations are resource-specific, some examples include Structured Query Language (SQL) queries, or key/value API operations such as findByPrimaryKey(Key), update(key,value), remove(key), create(key,value) and so forth.

The industry has implemented a two-phase commit (2PC) protocol, and various standards (e.g. CORBA Object Transaction Service (OTS), Java® Transaction API etc.) have been put in place in relation to the 2PC protocol. In transaction processing, databases, and computer networking, the two-phase commit protocol (2PC) is a type of atomic commitment protocol (ACP). It is a distributed algorithm that coordinates all the processes that participate in a distributed atomic transaction on whether to commit or abort (roll back) the transaction (it is a specialized type of consensus protocol). The protocol achieves its goal even in many cases of temporary system failure (involving either process, network node, communication, etc. failures), and is thus widely utilized. However, it is not resilient to all possible failure configurations, and in rare cases user (e.g., a system's administrator) intervention is needed to remedy outcome. To accommodate recovery from failure (automatic in most cases) the protocol's participants use logging of the protocol's states. Log records, which are typically slow to generate but survive failures, are used by the protocol's recovery procedures. Many protocol variants exist that primarily differ in logging strategies and recovery mechanisms. Though usually intended to be used infrequently, recovery procedures comprise a substantial portion of the protocol, due to many possible failure scenarios to be considered and supported by the protocol.

In a "normal execution" of any single distributed transaction, i.e., when no failure occurs, which is typically the most frequent situation, the protocol comprises two phases:

i) The commit-request phase (or voting phase), in which a coordinator process attempts to prepare all the transaction's participating processes (named participants, cohorts, or workers) to take the necessary steps for either committing or aborting the transaction and to vote, either "Yes": commit (if the transaction participant's local portion execution has ended properly), or "No": abort (if a problem has been detected with the local portion), and ii) The commit phase, in which, based on voting of the cohorts, the coordinator decides whether to commit (only if all have voted "Yes") or abort the transaction (otherwise), and notifies the result to all the cohorts. The cohorts then follow with the needed actions (commit or abort) with their local transactional resources (also called recoverable resources; e.g., database data) and their respective portions in the transaction's other output (if applicable).

Referring now to FIG. 3, in a known MVCC environment, an algorithm is used for implementing multiple isolation levels, including the strictest isolation. This means that the system is serializable.

Multiple versions of each database entry are stored, each with an associated version number or timestamp. The version number or timestamp is allocated by the database or the Resource handling the transaction. In the example shown in FIG. 3, the version number is shown as "DBTimeStamp=8". Version numbers or timestamps are typically a monotonically increasing sequence.

In FIG. 3, which shows a simple database with three entries A, B and C, it can be seen that entry A has versions 1, 2 and 3; entry B has versions 4, 5 and 8; and entry C has versions 6 and 7. Transactions observe a consistent snapshot of the contents of the database by storing the DBTimeStamp at the point of first access to the database or RM. For example, a transaction that started when DBTimeStamp had a value of 3 would only be able to see entry A version 3; a transaction that started when DBTimeStamp had a value of 5 would only be able to see entry A version 3 and entry B version 5; and a transaction that started when DBTimeStamp had a value of 7 would only be able to see entry A version 3, entry B version 5 and entry C version 7.

In other words, each entry in the database, and each change to an entry (e.g. creation, updates, removal etc.) is stored in the database along with a version number or timestamp. A transaction can only "see" the appropriate values in the database that are valid for that particular transaction. A transaction therefore has associated meta-data (a first-read timestamp) that is initialised when the transaction first reads/writes from/to the RM. The database only lets a transaction observe entries that have timestamps less than or equal to the timestamp of the transaction. This effectively confines the transaction to entries that have been made or changed prior to the timestamp of the transaction. Each time a given transaction commits, the current "global" timestamp of the RMs is moved forward, so that new transactions (started later) will see the modifications that the given transaction has made. In order to move the global timestamp forward, concurrent transactions have to use mutual exclusion to update the global timestamp.

Referring now to FIG. 4, a new transaction begins and is assigned a visibility of DBTimeStamp=8. In this example, the new transaction will update entry C, and commit. The transaction commits as follows, with operations 1), 2) and 3) being performed as a single action (i.e. the operations are not interleaved across concurrent transactions):

1) read DBTimeStamp with value 8
2) insert the new update creating C with version 8+1==9
3) update DBTimeStamp to value 9

In a local-only system it is possible to use locking to ensure correct ordering/non-interleaving. In a distributed system such as a multi-server cluster, in order to make database changes available across servers, it is usual to use an ordering to apply the changes to other nodes. In other words, all nodes apply the same changes, in the same order, using a deterministic algorithm. This means that, given the same starting state and the same changes being applied (in the same order), then each node will reach the same state. A total ordering of commit messages is used to ensure that the operations are not interleaved. Total ordering means that every server/node processes the same operations in the same order. The operations must be non-interleaved, otherwise the RM/DB or Client will result in incorrect data or states. This ordering enforces a one-after-the-other application of changes, which means that it is not possible to make use of parallelism, as it would not have any benefit.

Distribution is a key requirement for systems with availability and performance that is greater than the availability and performance of a single server. In addition, it is desirable to have a system where there are multiple active nodes so as to ensure high availability as well as scalability greater than the capacity of any single server. It is also desirable to reduce the general network chatter between nodes, and to prevent chatter from taking place mid-transaction. Accordingly, network messages are passed at the end of a transaction as part of the commit protocol.

Moreover, all nodes apply the same whole-commit in the same order (i.e. Total Ordering of Commits—TOC). This ensures that the commit operations are non-interleaved across different transactions. The application of a commit uses a deterministic algorithm, hence all nodes reach the same state.

The benefits of this known implementation are that it provides a scalable and highly available system architecture, it is active/active over N nodes, and communication takes place only at the end of a transaction, thereby reducing latency. There is, however, a significant drawback, in that a scalability bottleneck is created around commit ordering (since all commits must be executed serially).

If a certain isolation level (e.g. read-committed, or repeatable-read, or serializable, and so forth) is needed, then it is necessary to have a Resource that provides such isolation. Moreover, if multiple Resources are involved in a transaction, then there is a problem that the overall isolation will be less than the isolation of a single Resource. This is because different Resources can release internal resources (such as locks) when they commit, and the Resources commit at different times. As a result, Applications can observe changes in one Resource before they can observe changes in another Resource, leading to data corruption. This is not a particularly problematic issue if Applications or Resources always use a form of pessimistic concurrency control, but if some parts of the system use optimistic concurrency control and other parts use pessimistic concurrency control, then guarantees are lost if the entries are spread across multiple Resources.

Referring now to FIG. 5, this shows a simple system with two nodes (Server 1 and Server 2), each in the same state. Each node applies the same transactions in the same order, resulting in the same state after the transactions. In the illustrated example, the transaction is an update to entry B. In simple terms, in a distributed system where any member of a group can multicast a transaction message to any other member, certain problems can arise. One of the most significant is that messages can be interleaved. For example, if process X sends message 1 and process Y sends message 2, it is possible that some group members receive message 1 first, and others receive message 2 first. If both messages update the value of some shared data structure, then it is possible that different members will have different values for the data structure after the transaction. TOC helps to prevent this situation by forcing all messages or transactions to be accepted and processed in some fixed order. Timestamps are one way of doing this, and these allows receivers getting an out-of-sequence message to recognise it as such, and to hold the message until the preceding message has been received.

There is a useful and detailed discussion of distributed multi-version commitment ordering protocols for guaranteeing serializability during transaction processing in U.S. Pat. No. 5,701,480, the full contents of which are hereby incorporated into the present application by way of reference.

U.S. Pat. No. 5,701,480 explains in detail how it is possible to define a single global serializability across multiple Resources in multi-value databases.

It is well known that global serializability is not guaranteed merely by ensuring that each processor or process achieves local serializability, because local transactions may introduce indirect conflicts between distributed global transactions. It is impractical to permit a processor or process to view a global picture of all the conflicts in all of the other processors or processes. Without a global picture, however, it is difficult for a processor or process to ensure that there is a correlation between its serializability order and the serializability orders of the other processors or processes. Time-stamping of transaction requests and data updates is one method that has been used to address this problem of concurrency control. In general, concurrency control in a distributed computing system has been achieved at the expense of restricted autonomy of the local processors or processes, or by locking.

Global serializability can be guaranteed in a distributed transaction processing system by enforcing a "commitment ordering" for all transactions. U.S. Pat. No. 5,504,900 shows that if global atomicity of transactions is achieved via an atomic commitment protocol, then a "commitment ordering" property of transaction histories is a sufficient condition for global serializability. The "commitment ordering" property occurs when the order of commitment is the same as the order of performance of conflicting component operations of transactions. Moreover, it is shown that if all of the local processes are "autonomous," i.e. they do not share any concurrency control information beyond atomic commitment messages, then "commitment ordering" is also a necessary condition for global serializability.

However, neither U.S. Pat. No. 5,701,480 nor U.S. Pat. No. 5,504,900 addresses the issue of scalability. Scalability is the ability of a system, network, or process to handle a growing amount of work in a capable manner or its ability to be enlarged to accommodate that growth. For example, it can refer to the capability of a system to increase total throughput under an increased load when resources (typically hardware) are added.

Scalability is a highly significant issue in databases and networking. A system whose performance improves after adding hardware, proportionally to the capacity added, is said to be a scalable system.

An algorithm, design, networking protocol, program, or other system is said to scale, if it is suitably efficient and practical when applied to large situations (e.g. a large input data set, a large number of outputs or users, or a large number of participating nodes in the case of a distributed system). If the design or system fails when a quantity increases, it does not scale.

BRIEF SUMMARY OF THE DISCLOSURE

Viewed from a first aspect, there is provided a method of processing transactions requested by an application in a distributed computer system comprising:

at least one resource comprising a plurality of storage areas each with an associated resource manager, the storage areas holding the same tables as each other;

or a plurality of resources each comprising at least one storage area with an associated resource manager, the storage areas holding the same tables as each other;

a transaction manager that is linked, by way of a network or a local application programming interface (API), to each of the resource managers, the transaction manager being configured to coordinate transaction prepare and commit cycles;

wherein the application requests operations on the resources by way of an interface;

wherein a dispatch function directs transactions from the application to the appropriate storage area or storage areas on the basis of the content of the tables in the storage areas, in such a way that any given transaction is routed only to the storage areas containing entries upon which the transaction operates, allowing another transaction operating on different entries to be routed concurrently in parallel to other storage areas; and wherein a safe timestamp manager is provided to allocate new timestamps for committing transactions in a single order.

Viewed from another aspect, there is provided a distributed computer system comprising:

at least one resource comprising a plurality of storage areas each with an associated resource manager, the storage areas holding the same tables as each other;

or a plurality of resources each comprising at least one storage area with an associated resource manager, the storage areas holding the same tables as each other;

a transaction manager that is linked, by way of a network or a local application programming interface (API), to each of the resource managers, the transaction manager being configured to coordinate transaction prepare and commit cycles;

an interface to allow an application to request operations on the resources;

a dispatch function to direct transactions from the application to the appropriate storage area or storage areas on the basis of the content of the tables in the storage areas, in such a way that any given transaction is routed only to the storage areas containing entries upon which the transaction operates, allowing another transaction operating on different entries to be routed concurrently in parallel to other storage areas; and a safe timestamp manager is to allocate new timestamps for committing transactions in a single order.

Although the storage areas hold the same tables, the tables may be populated with different entries. In other words, each storage area may have different entries in its table from the other storage areas.

The resource manager may be considered to be simply an interface between a storage area and the transaction manager. The storage areas within the resources hold the tables. Each storage area has an associated resource manager. If a resource has only one storage area, then scalability is achieved by dispatching across multiple resources. For resources with multiple storage areas, scalability can be achieved by dispatching in parallel across the multiple storage areas.

Viewed in another way, the resource manager is the part of the resource that communicates with the transaction manager (for example, according to an Object Transaction Service, and under Java Transaction API).

Applications may talk to databases using a query language (e.g. SQL). Applications may talk to "noSQL" databases using a query language, or an API. Applications may talk to "transactional memory" using an API. Applications may be co-resident with the "database" or "transactional memory" (and therefore are using an API), or if applications are "external" to the "database" and so use a protocol.

Accordingly, the interface by which the application communicates with or requests operations on the resource may take the form of a client API, and/or a query language, and/or a protocol or any other suitable form.

If a transaction operates on or required more than one resource, then an external transaction manager is required. If a resource has more than one storage area internally, then it will the resource will need multiple resource managers, one for each storage area.

In other words, there is provided one resource manager for each storage area. A transaction manager is required, and the transaction manager may or may not need to be an external transaction manager (that is, external to the resource).

Accordingly, a resource has one or more storage areas (for internal dispatch or partitioning). A storage area has a resource manager. An external transaction manager is only needed if there is more than one resource used in a given transaction.

If only one resource is used in a transaction, then (regardless of whether or not the resource uses more than one internal storage area), an internal transaction manager can be used. If there is only one resource, and there are multiple storage areas, then embodiments of the present invention will use 2PC, and so will require a transaction manager.

As such, depending on requirements, the transaction manager may be internal to the resource or external to the resource.

By providing a dispatch function to interface between the application and the plurality of resources, the present invention allows the application to operate as if it is communicating with only a single resource, with the dispatch function directing transactions across appropriate resources, in some cases in parallel, without the application needing to be aware of the presence of multiple resources.

Moreover, the dispatch function may be part of the resource, or it may be part of the application. Specifically, the dispatch function is part of the resource if the resource wants internally to divide its state (e.g. scalability). Alternatively, the dispatch function may be part of the application if the application needs to access more than one resource (e.g. resources that contain different types of data). The dispatch function is responsible for intelligently distributing requests to the appropriate storage areas (when part of the resource) and for intelligently distributing requests to the appropriate resource (when part of the application).

Dispatch can be considered as existing in any of three places, potentially simultaneously:

i) Dispatch inside the application (this is then across multiple resources, and is implicit in the application design)

ii) Dispatch as a "proxy" between the application and the various resources (in which case the application may not need to be designed to get scalability advantages)

iii) Dispatch internally inside a resource; in this case, the resource dispatches to its own storage areas Any given resource has a scalability limit, and different resources can have different scalability limits (due to different algorithms, internal software design limitations, hardware limitations etc.). Using global serializability as a basis, it is possible to implement an improved scalability. Global serializability is a prerequisite for embodiments of the present invention so as to ensure that application clients get consistent results out of the distributed database, taking into account locking modes and the like. A particular target is to achieve a system with N resources having N times the scalability of each resource, while still providing atomicity and global serializability.

The dispatch function may implement an API, or protocol, that is used by the application. This may be the same API or protocol that is used by the individual resources. The application communicates with the transaction manager (TM) and with the dispatch function. However, the application does not necessarily realise that it is communicating with the dispatch function per se, but instead thinks that it is communicating with any one of the resources directly.

Every resource holds the same tables (or key space). This means that creating a table at the dispatch function level will create an equivalent table in each resource.

The dispatch function steers operations or transactions (for example, when a database row/object/entry is created, updated or removed) across different resources. Any operation on a particular row/object/entry is given to the same resource, i.e. one entry resides in one resource. This means that a transaction using entries A and B, for example, may use a different resource to a transaction using entry C. This can be done by using a function to spread entries across the resources. A simple function of this type, for example, would find the resource to use for any given transaction by taking the hash-code of the entry's Primary Key (or some other unique identifier including any index value that can be used to retrieve the entry in question) modulo the number of resources (N). This means that it is possible to run transaction commits in parallel, as each resource has its own commit mechanism. An important advantage obtained by running these transactions in parallel is that they can be directed to use completely different resources from each other, which means that the scalability can be improved.

The dispatch function and co-location in a particular resource may be better understood by considering that in many data models, there are entries that are related to each other. The way in which the entries are related to each other is application dependent. One simple example is a person and his possessions. Most people have their own possessions, for example car, wallet, keys, mobile phone. Indeed, most people have independent sets of possessions. Sometimes some possessions may be shared (e.g. by the person's family), but more often than not, the sets of possessions are independent of another random member of the human population. In this example, "ownership" can be seen as a useful mechanism for logically grouping otherwise independent items (car, wallet, keys, mobile phone).

When expressing this as a data model, each item will have a unique identifier or Primary Key. For example, there may be two different wallets—the first is wallet #111111, and the second is wallet #222222. Each item may have an attribute that identifies its ownership, for example wallet #111111 owned by person #1 and wallet #222222 owned by person #2. Likewise, the owner may have a set of possessions that he owns.

If all of the items are simply "hash-spread" into different resources (i.e. hashing each item's Primary Key modulo the number of resources), 2PC must be used for a large percentage of transactions, if transactions frequently include more than one item.

Embodiments of the present invention can be configured to avoid 2PC overheads. It is well-known that 2PC transactions are more resource intensive than single-phase commit transactions. The 2PC protocol requires extra communications between the TM and the RMs, which takes up additional computer cycles.

If each entry is always hashed into a resource solely on the basis of its identifier's hash-code, then the entries are not distributed in an optimum way, and it may become necessary to use 2PC for any transaction that uses more than one entry. This would harm the overall performance of the system.

It is therefore advantageous for related items to be co-located in the same resource. Accordingly, related rows/objects/entries are advantageously grouped in to the same resource as each other. By placing rows/objects/entries that are likely to be used in the same transaction on a single resource, it is possible to avoid the need for blanket implementation of a 2PC protocol. This is because, when the entries being modified by a given transaction are only in the single resource and not in any others, there is no need to wait for the other resource to vote before committing in the single resource. As a result, truly independent transactions operating on independent entries can use different resources concurrently.

In other words, the system is configured to make use of the concept of a "co-location identifier". The data model is marked up in order to identify the field in the data model that is to be used as the co-location identifier, and the dispatch function then hash-spreads across resources or storage areas based on the co-location identifier. In the example given above, the co-location identifier would be the owner of the items, not the Primary Key. This means that, in the given example, all possessions of a specific person would be dispatched to the same resource and, since most humans are independent of each other, parallelism may be gained by spreading over multiple resources.

Accordingly, the dispatch function in this case is a hash-spread algorithm based on the co-location identifier. Given that the particular method of co-location depends on the application's data model, it is necessary either to use a specific function provided by the application, or it is necessary to mark up the data model to identify a suitable co-location identifier.

It is therefore possible to define a mechanism were steps can be interleaved between transactions and both the application and the resources will achieve the correct states. This provides significantly greater scalability than in known systems.

An important aspect of the disclosed method and system is the Safe Timestamp Manager that allocates new timestamps for committing transactions. The Safe Timestamp Manager is used for every transaction that begins to commit in the system, not just in cases where there is more than one resource in the transaction. New transactions requested by the application are given the latest "Safe Timestamp" when they first access a resource or the database in general. The "Safe Timestamp" provides the visibility for a Transaction. Given that timestamps are a monotonically increasing sequence, the "Safe Timestamp" is defined as the highest timestamp where all transactions with timestamps less than or equal to the Safe Timestamp have been completed. Each transaction is assigned a unique timestamp by the Safe Timestamp Manager as it begins commit processing. As transactions are completed, the Safe Timestamp will increase to reflect this. The Safe Timestamp Manager is also configured to store the state in commit processing (the transaction commit state) for each committing transaction, and to store the Safe Timestamp for transactions that have committed. In addition, the Safe Timestamp Manager stores the highest allocated commit timestamp, and each committing transaction is assigned its own unique timestamp.

The storage areas in the resource are used to store the entries and their generations. The storage areas can themselves prepare and commit transactions, and therefore act as RMs in the 2PC approach. The entries are spread across the storage areas in such a way that any given entry and all its generations are stored in one and only one storage area (although it will be appreciated that one storage area may contain more than one entry and its generations).

The Safe Timestamp Manager creates and stores a transaction record for each transaction. The transaction record may be formatted to have five attributes:

i) a transaction identifier for the transaction
ii) the unique timestamp allocated to the committing transaction
iii) a list of storage areas used by the transaction
iv) the number of storage areas that have been committed
v) the status of the committing of the transaction (i.e. Commit State in the transaction record format)

The Commit State may be one of:
a) Unallocated—slot is not used
b) Pending—the transaction has started to commit, but some RMs have not completed committing
c) Finished—all changes to entries in the storage areas resulting from the transaction have been committed, and the transaction is complete This allows a new commit protocol to be implemented. When a transaction requested by the application first accesses the resource, the Safe Timestamp Manager hands out the current safe timestamp. This is a read-only operation, and concurrent transactions do not need to lock against each other in order to obtain the current value of the safe timestamp.

As each storage area communicates with a single RM, each RM is informed to commit by the Transaction Manager (TM). As part of a commit operation, a storage area bundles together its own commit message, and in the case of a distributed system, the commit message is transmitted via a network protocol to all replicas for the Storage Area, the protocol being defined by the Storage Area. Each storage area has its own independent Total Order, and therefore commit messages for different storage areas are received and processed in different Total Orders. Accordingly, the commit messages for different storage areas can be processed independently and concurrently. In the case of a local system, each storage area/RM uses a local object as the commit message, and this local object does not need to be sent or received—it can be processed locally.

The commit message may contain a transaction identifier, the storage area represented by the RM and the total number of storage areas used in the transaction.

If a transaction has updated multiple storage areas, then there are multiple commit messages generated for that transaction. These commit messages may be sent in parallel and also processed in parallel.

When a commit message is received and processed, the following steps take place. It will be noted that the steps may occur in parallel for concurrent commit messages, and therefore for concurrent transactions:

1) Request a timestamp for the transaction from the Safe Timestamp Manager, the transaction being identified by its transaction identifier. The Safe Timestamp Manager checks its transaction records, and if a timestamp has already been allocated to the transaction, this timestamp is returned. If a timestamp has not yet been allocated, the Safe Timestamp Manager will allocate a new timestamp to the transaction identifier and return the new timestamp. In order to allocate a new timestamp, the Safe Timestamp Manager reads, increments and updates the "highest allocated timestamp". The Safe Timestamp Manager then allocates a new record, sets its state to Pending, and records the number of storage areas/RMs that have been modified by the transaction. The number of committed storage areas/RMs in the transaction record is then set to zero.

2) Commit the changes to the identified storage area. Changes are applied from the transaction to the storage area, and the changes are marked with the allocated timestamp.

3) Atomically increment in the transaction record the number of storage areas that have committed.

4) If the number of storage areas updated is equal to the number of storage areas committed, then the transaction record state is marked as Finished, and the Safe Timestamp Manager atomically calculates the new safe timestamp. Future transactions will use the new safe timestamp for their isolation.

Steps 1), 2), 3) and 4) of this commit protocol may be interleaved between different transactions. Moreover, each of steps 1), 2), 3) and 4) may execute in parallel if there are concurrent committing transactions. If enough storage areas are configured, and entries are spread sufficiently well across the storage areas, then contention on any given storage area is low. The number of storage areas is tuneable, and can therefore be appropriately sized for different hardware configurations. Although each of steps 1), 2), 3) and 4) may contain critical regions, these are typically relatively small, so the protocol as a whole can be implemented in a highly scalable manner.

To summarize, a dispatch function is important when a resource does not have sufficient scalability. The dispatch function is required in order to direct transactions to the appropriate resources. When using multiple resources for scalability, it is possible to dispatch independent queries or transactions to different resources, in which case additional parallelism is possible. This only works, however, for truly independent transactions directed to separate resources, since the transactions will not affect each other or conflict when running simultaneously. Using 2PC (with a Transaction Manager) across the different resources helps to ensure that the commit/rollback of the multiple resources works in a sensible way.

However, when a query or transaction needs to be effected across multiple resources, there arises a serious problem of visibility, since the resources do not cooperate to provide the correct visibility. Accordingly, a novel Safe Timestamp Manager is provided in order to give the correct visibility when multiple resources are used in a single transaction (the visibility being as good as the visibility of a single resource). In this way, embodiments of the present invention provide the advantages of scalability together with the correct visibility, which has not hitherto been achieved.

BRIEF DESCRIPTION OF THE DRAWINGS

Embodiments of the invention are further described hereinafter with reference to the accompanying drawings, in which.

DETAILED DESCRIPTION

Figure 1:
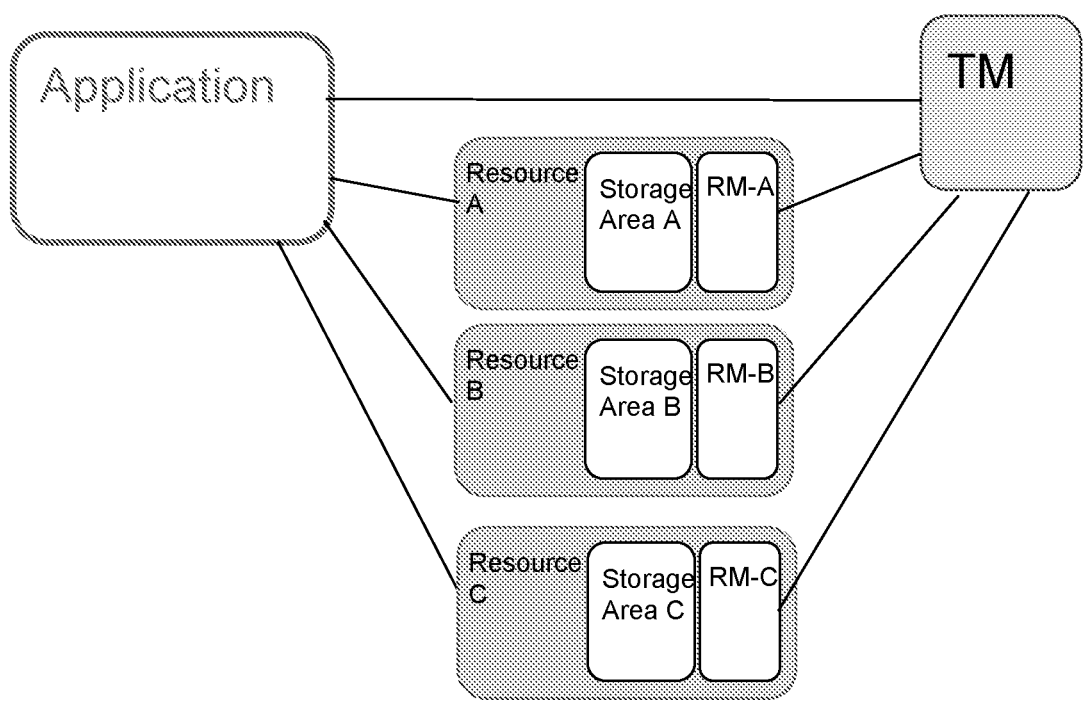
FIG. 1 shows a known database system.
Figure 2:
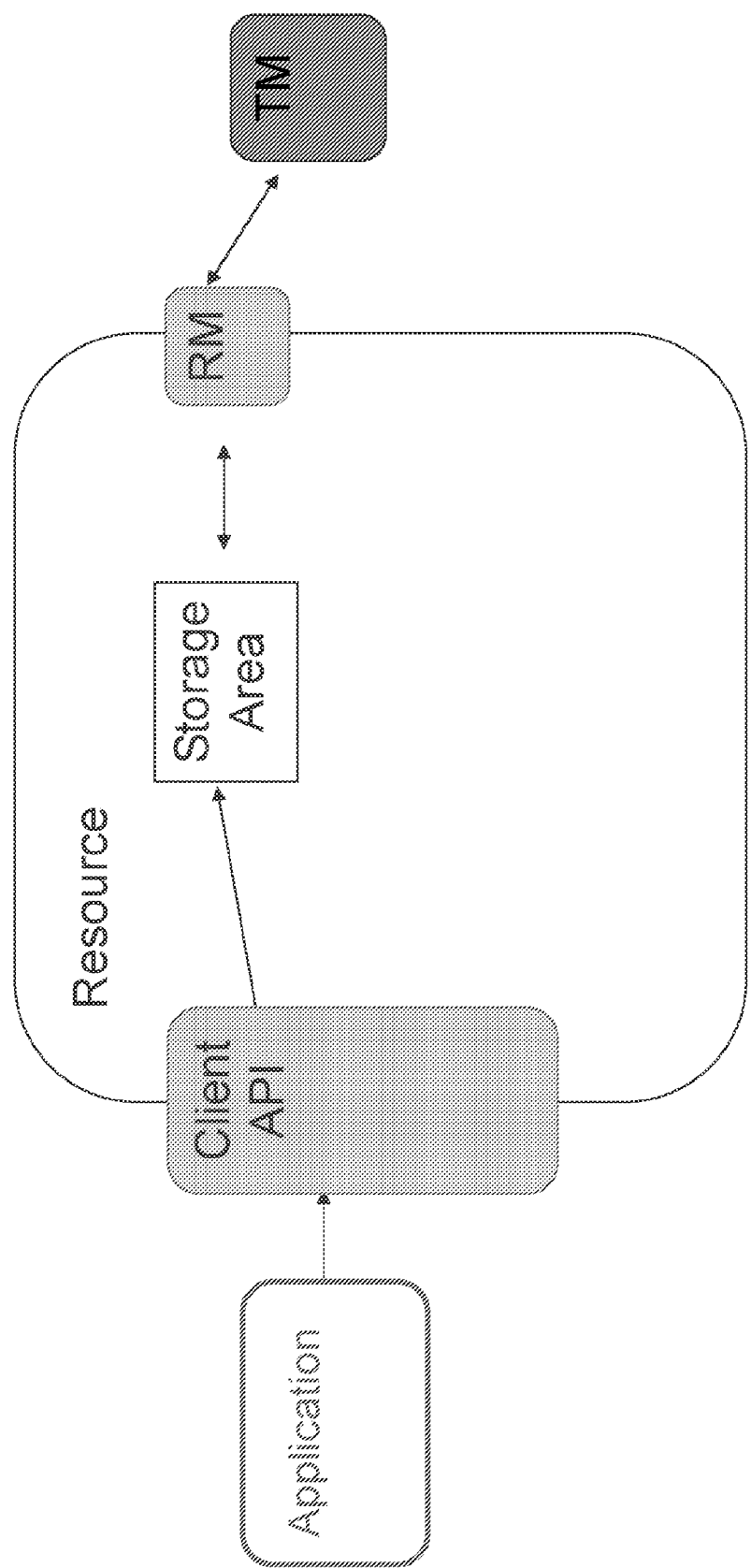
FIG. 2 shows an alternative view of a known database system.
Figure 3:
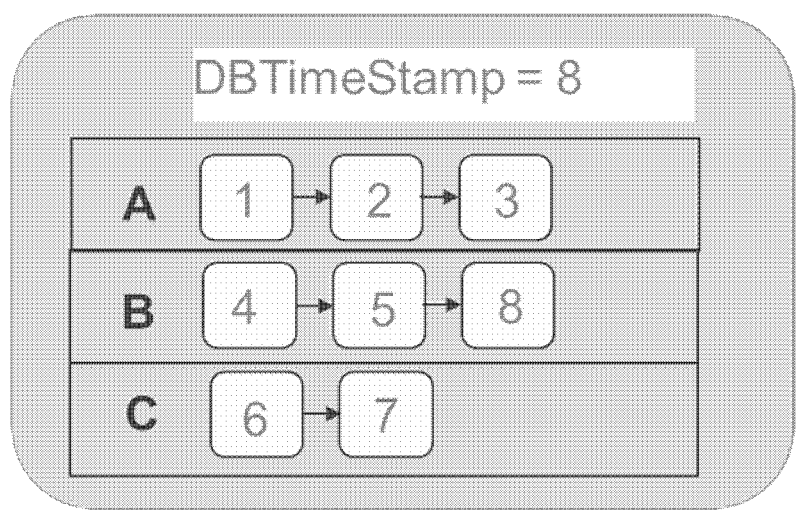
FIG. 3 shows a simple known database with three entries A, B and C.
Figure 4:
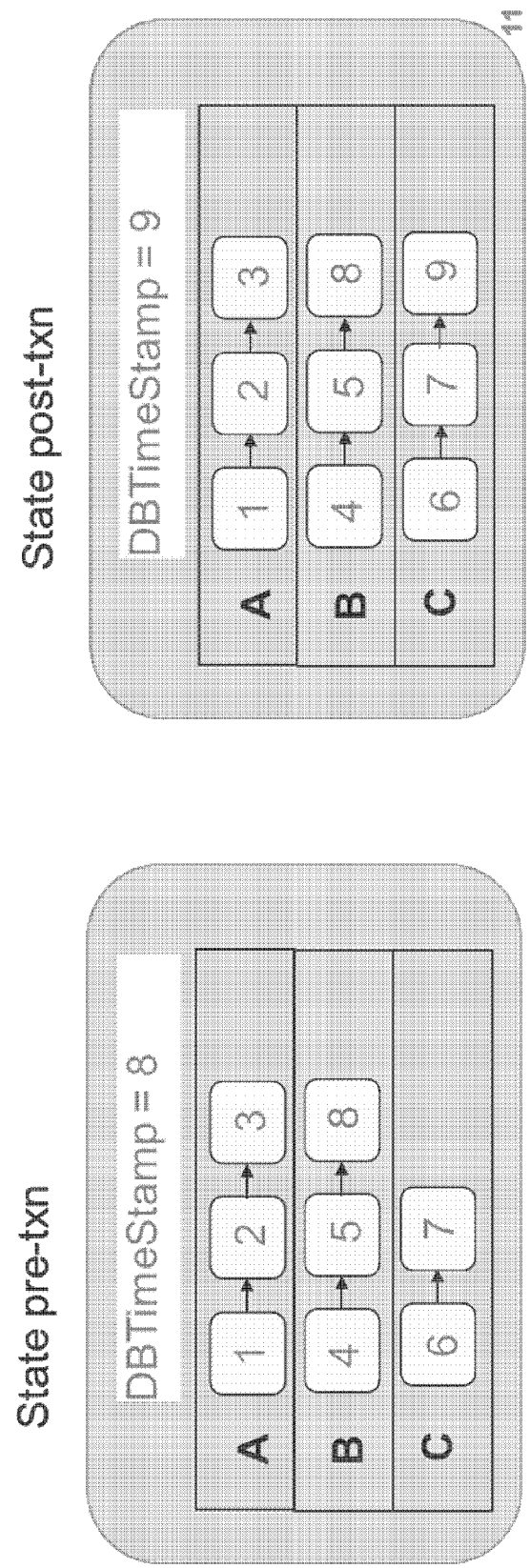
FIG. 4 shows a transaction on the database of FIG. 3.
Figure 5:
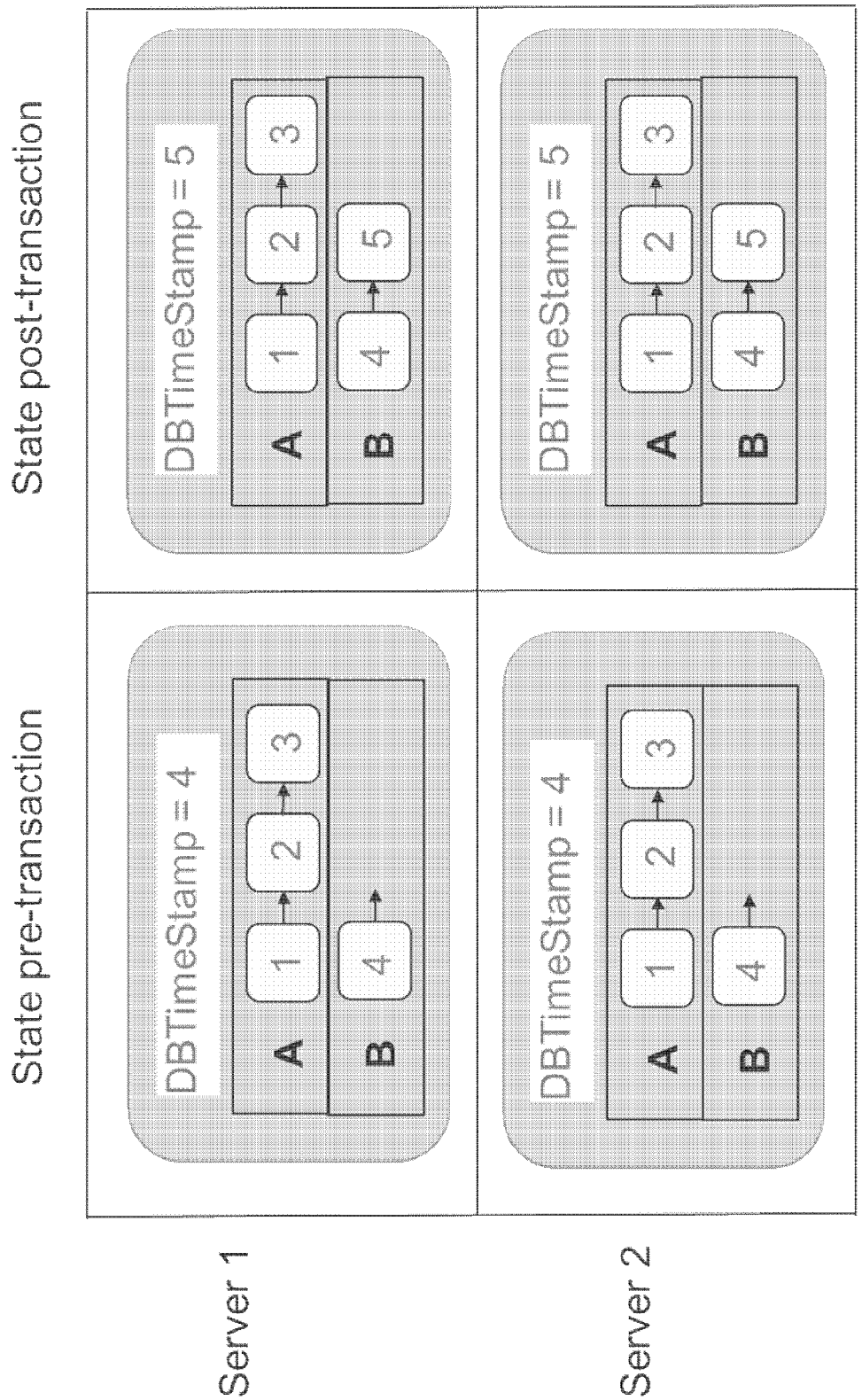
FIG. 5 shows a simple system with two nodes (Server 1 and Server 2), each in the same state.
Figure 6:
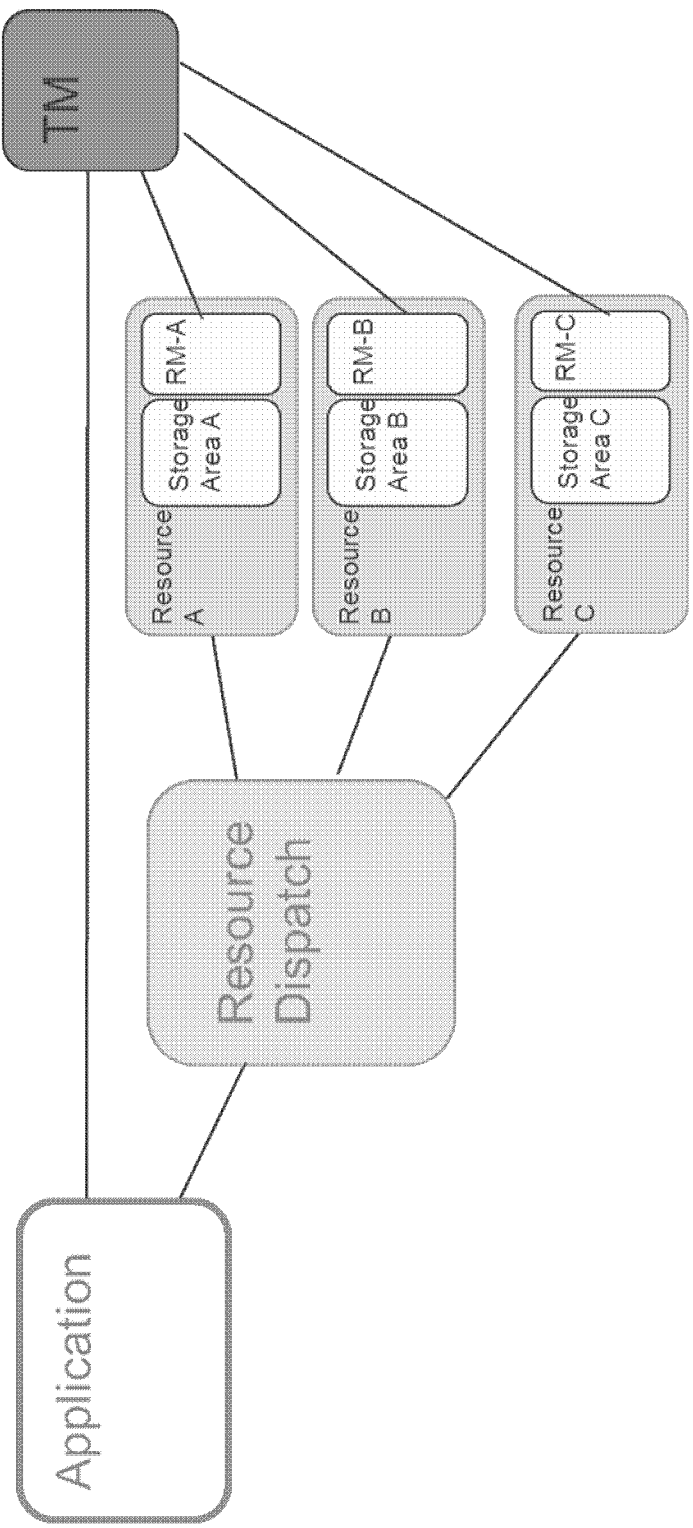
FIG. 6 shows an embodiment of the present invention.

FIG. 6 shows a first embodiment of the present invention in simplified form, comprising a database system in which transactions or changes to entries in the database resulting from operations of the Application are controlled by a Transaction Manager (TM) or Transaction Co-ordinator and multiple Resource Managers (RMs). The TM co-ordinates multiple RMs into a single "global" transaction. The Application communicates with each Resource and also with the TM. This may be by way of APIs and/or a protocol. The Application may be considered as a program that uses and manipulates the entries in the database, with the database internally distributing the entries across multiple Resources. In contrast to the database system of FIG. 1, there is additionally provided a dispatch function (indicated here as Resource-Dispatch) between the Application and the Resources. The dispatch function directs transactions from the Application to the appropriate Resource(s) on the basis of the content of the tables in the Resource, in such a way that any given transaction is routed only to the Resources containing entries upon which the transaction operates, allowing another transaction operating on different entries to be routed concurrently in parallel to other Resources.

Figure 7:
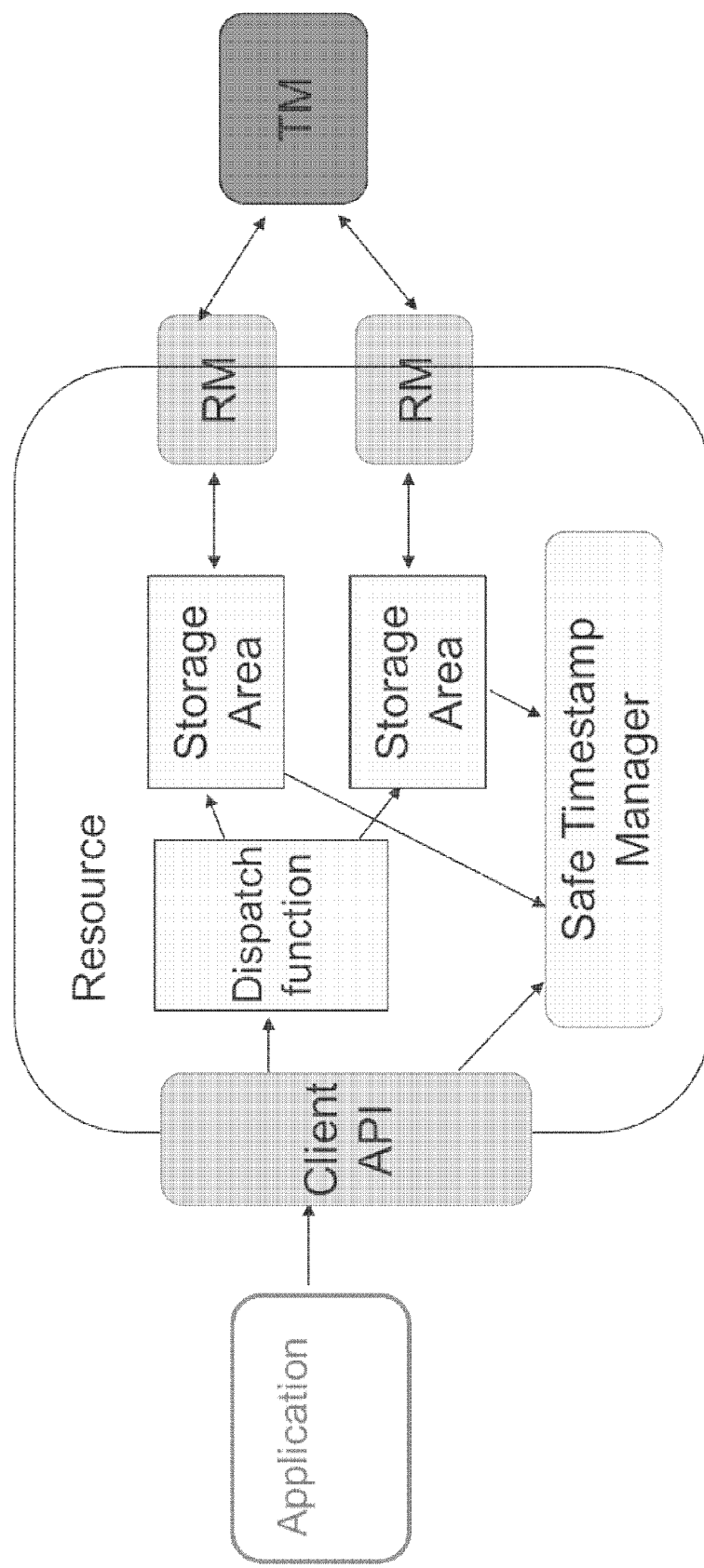
FIG. 7 shows an alternative view of an architecture of an embodiment of the present invention.

An alternative view of an embodiment of the present invention is shown in FIG. 7. Here there is shown a resource (for example, a database) that includes multiple storage areas. A resource in this context is a system or component that participates in a transaction processing system. The resource in FIG. 7 may, at its simplest, be considered as a storage area that is managed by an RM. The RM is simply an interface exposed by a transacted resource to the TM. The RM allows the TM to coordinate transaction boundaries across multiple resources. Multiple RMs may be present in a single resource. The RM may perform operations such as prepare( ), commit( ) and rollback( ). These operations are invoked by the TM. A dispatch function between the client API and the storage areas and intelligently distributes requests emanating from the application by way of the client API to the appropriate storage areas. The TM invokes the RMs, and is only concerned with managing the prepare/commit/rollback lifecycles for the various RMs used in its transactions. The Application can access the resource by way of a Client API or protocol that interfaces between the Application and the resource, and which allows the Application to ask the resource to do something. Operations are resource-specific, but typically include operations such as findByPrimaryKey(Key), update(key,value), remove(key), create(key,value) and so forth.

The embodiment of FIG. 7 additionally includes a Safe Timestamp Manager, here shown as part of the resource that uses many storage areas (only two are shown for clarity). The Safe Timestamp Manager interfaces with the storage areas and ensures that application transactions will not see partially committed transaction results. The Safe Timestamp Manager allocates timestamps to transactions, and is also used by the client API/protocol implementation.

Figure 8:
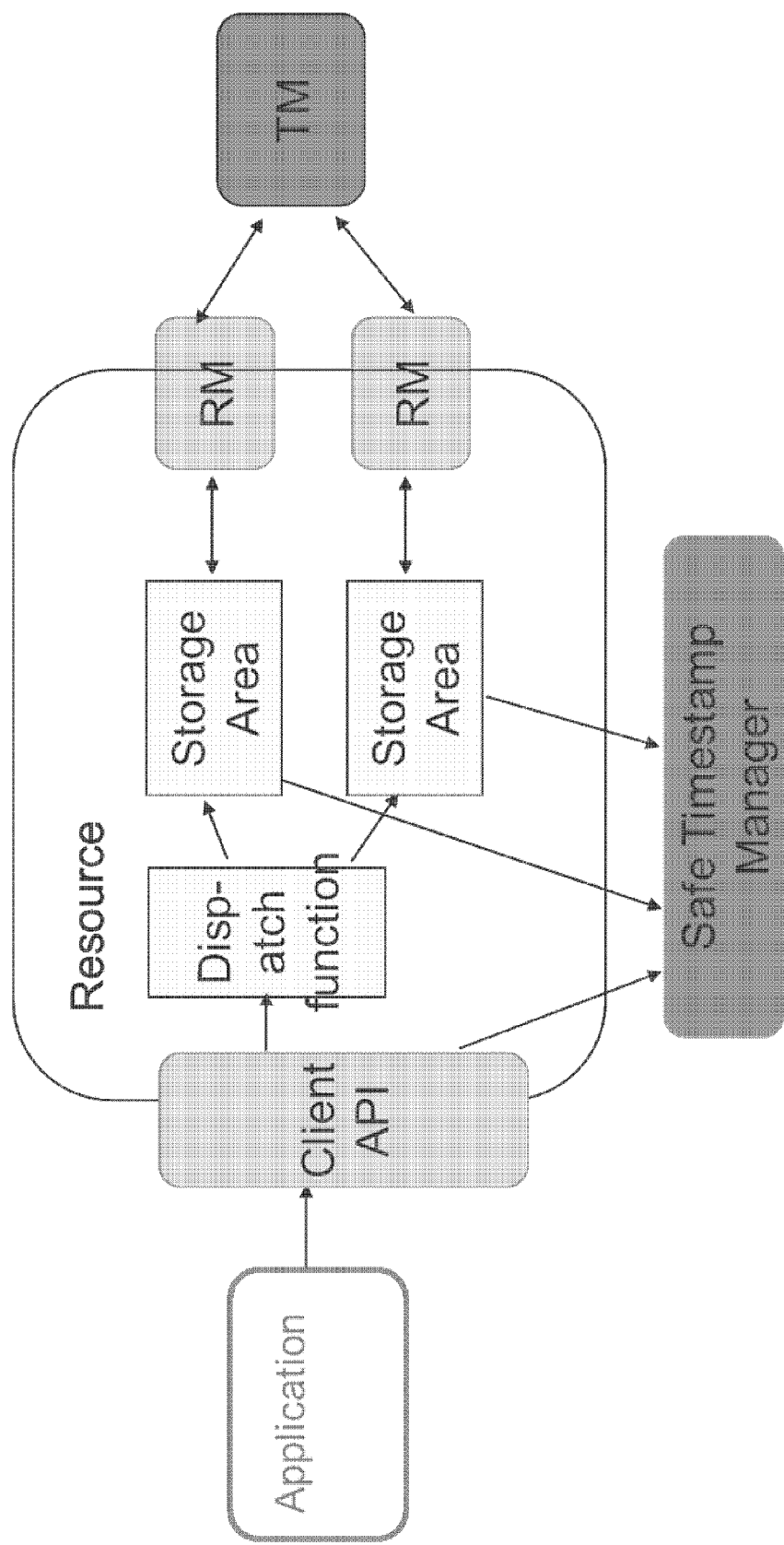
FIG. 8 shows an alternative embodiment to that shown in FIG. 7.
Figure 9:
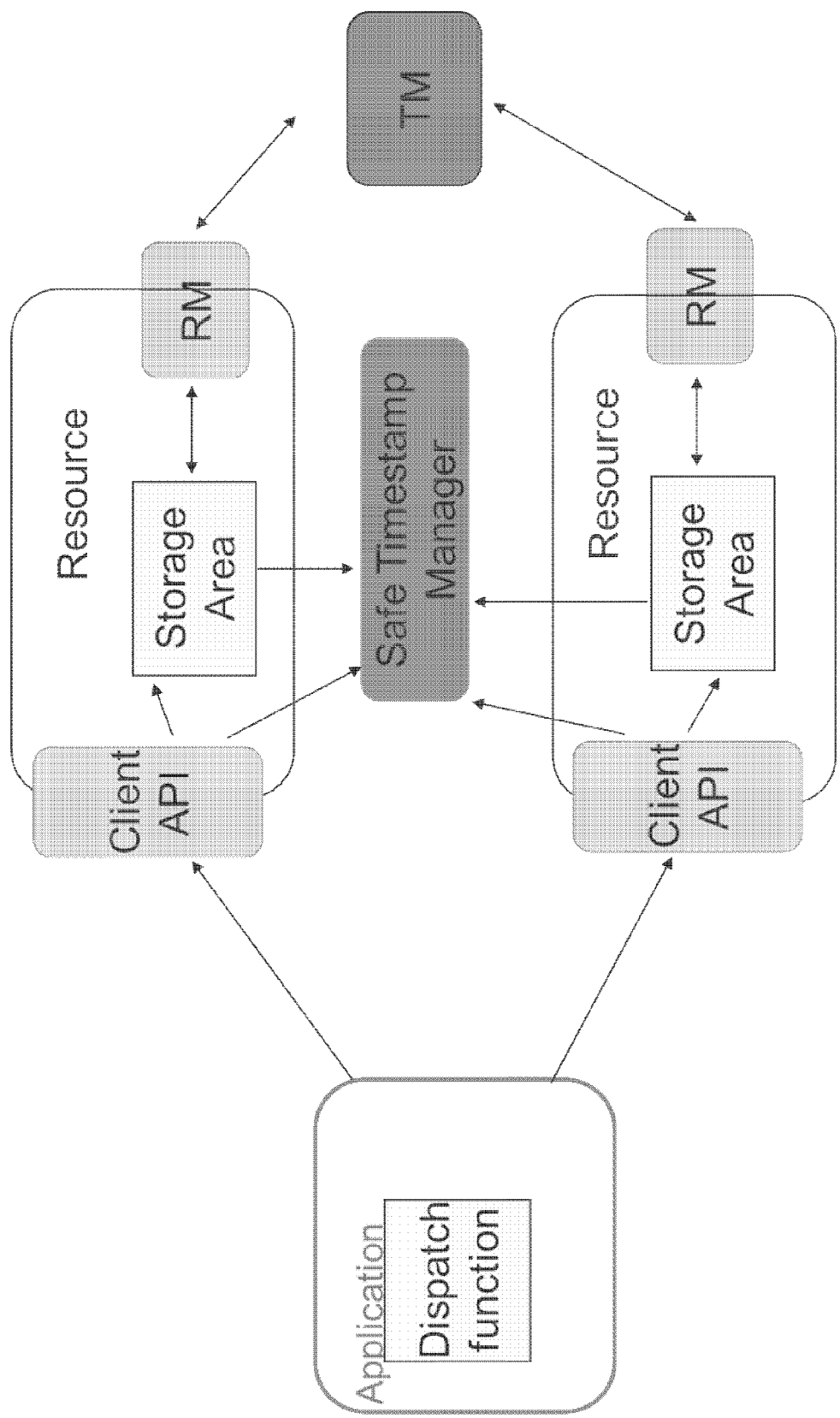
FIG. 9 shows a further development of the embodiment of FIG. 8.

FIG. 8 shows an alternative embodiment to that shown in FIG. 7. The difference here is that the Safe Timestamp Manager is external to the resource, and can therefore be shared across different resources (for example containing different types of data), as shown for example in FIG. 9.

Figure 10:
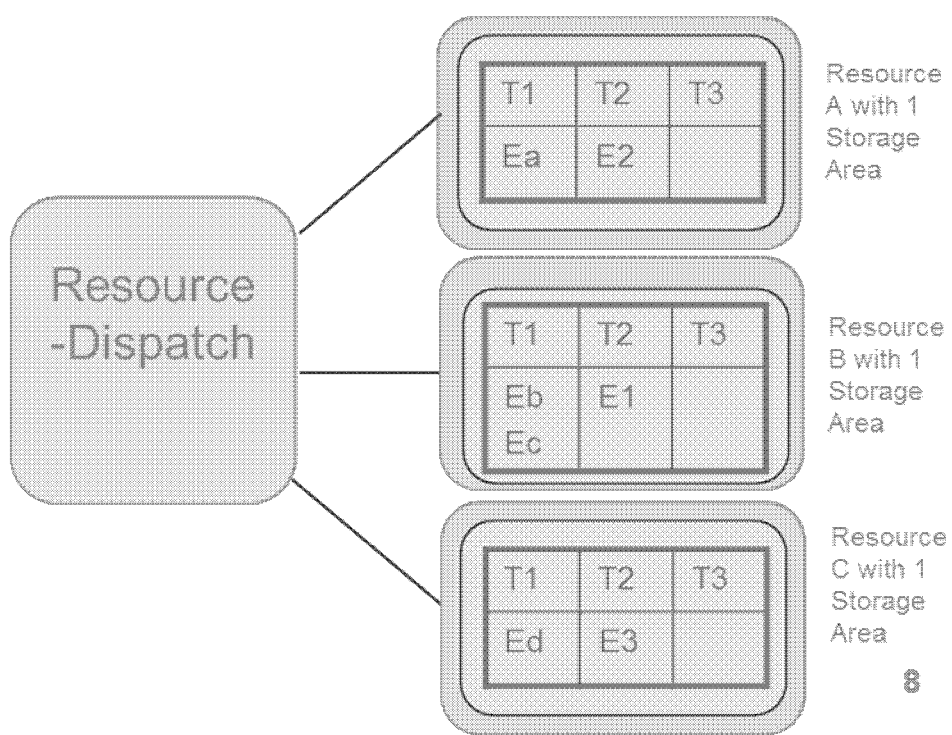
FIG. 10 illustrates a first aspect of the operation of an embodiment of the invention.

FIG. 10 shows three Resources (Resource A, Resource B and Resource C) with their storage areas and a component for implementing a dispatch function (RM-Dispatch). Every Resource holds the same tables or key space. In other words, creating a table at the dispatch function level will create a table in each Resource. The dispatch function steers operations across the different Resources, for example when a database row/object/entry is created, updated or removed. Any operation on a particular row/object/entry is given to the same Resource; in other words, one entry resides in one Resource. Therefore, a transaction using, say, entries A and B may use a different Resource than a transaction using entry C. This may be achieved by using a function to spread entries across the Resources. A simple function of this type, for example, would find the RM to use for any given transaction by taking the hash-code of the entry's Primary Key (or some other unique identifier including any index value that can be used to retrieve the entry in question) modulo the number of Resources (N). This means that it is possible to run transaction commits in parallel, as each Resource has its own commit mechanism.

As shown in FIG. 10, each of Resource A, Resource B and Resource C holds the same tables T1, T2 and T3. Resource A has entry Ea in T1 and entry E2 in T2. Resource B has entries Eb and Ec in T1, and entry E1 in T2. Resource C has entry Ed in T1 and entry E3 in T2. All the Resources have an empty table T3.

It is well-known that 2PC transactions are more resource intensive than single-phase commit transactions. The 2PC protocol requires extra communications between the TM and the RMs, which takes up additional computer cycles.

If each entry is always hashed into a Resource solely on the basis of its identifier's hash-code, then the entries are not distributed in an optimum way, and it may become necessary to use 2PC for any transaction that uses more than one entry. This would harm the overall performance of the system.

Accordingly, related rows/objects/entries are advantageously grouped in to the same Resource as each other. By placing rows/objects/entries that are likely to be used in the same transaction into a single Resource, it is possible to avoid the need for blanket implementation of a 2PC protocol. This is because, when the entries being modified by a given transaction are only in the single Resource and not in any others, there is no need to wait for the other Resources to vote before committing in the single Resource. As a result, truly independent transactions operating on independent entries can use different Resources concurrently.

With reference to FIG. 10, the three Resources (Resource A, Resource B and Resource C) each contain various entries. The entries are inserted into a particular Resource based on their own identifiers (e.g. primary/secondary keys), and also based on application-specific information made available to the dispatch function at runtime. This can be encoded into the entry identifiers, or provided as Meta Data for the individual entries. As a result, the dispatch function can select which Resource to select for any given entry based on entry identifiers. Entries in the same Resource can be considered to be more likely to be used in a single transaction than entries in different Resources, and this reduces the overhead of 2PC, allowing truly independent transactions to use different Resources.

Figure 11:
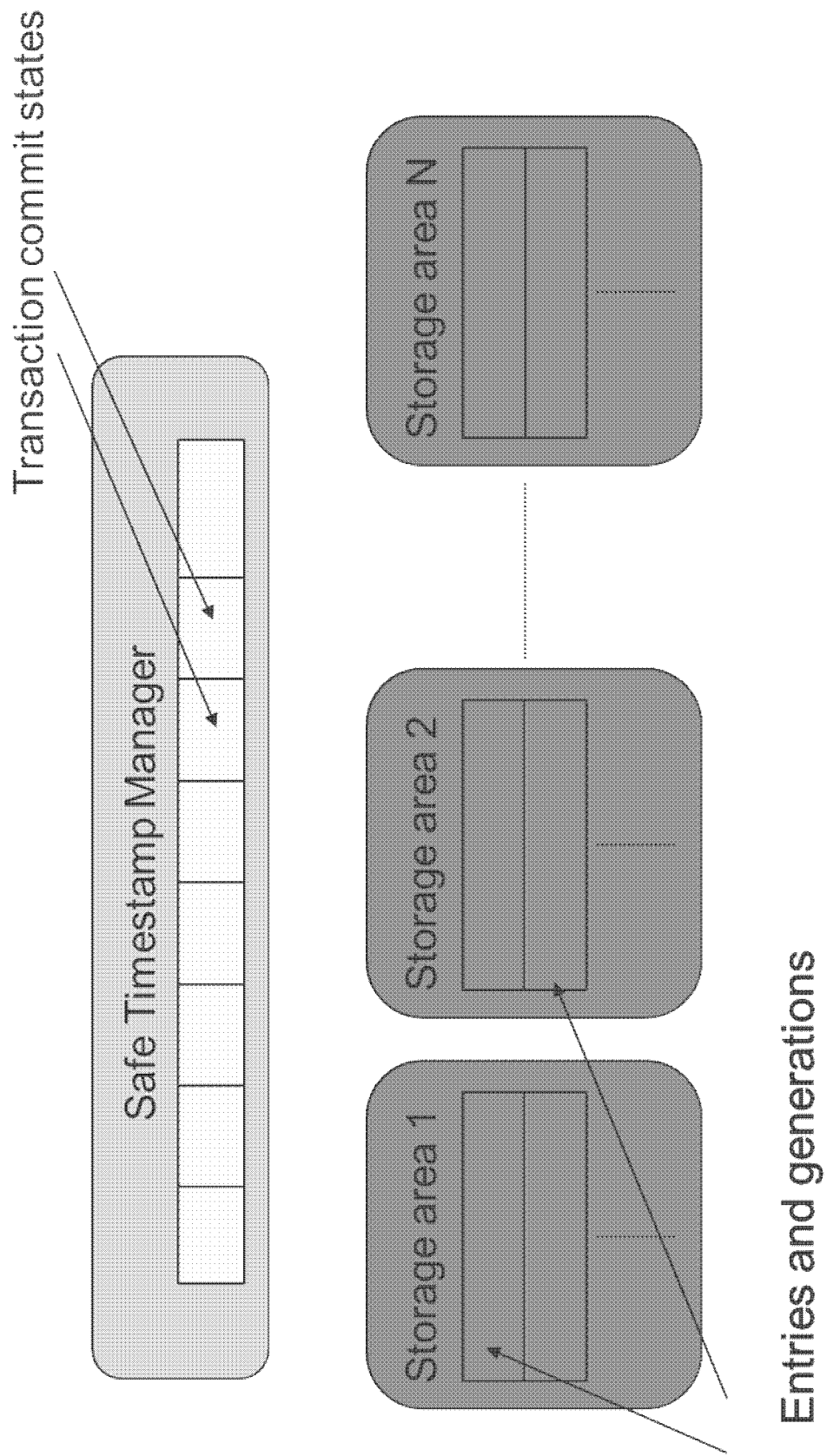
FIG. 11 illustrates a Safe Timestamp Manager in an embodiment of the invention.

The operation of the Safe Timestamp Manager together with storage areas 1, 2, . . . N is shown in more detail in FIG. 11. The Safe Timestamp Manager allocates new timestamps for committing transactions. New client transactions are given the latest "safe timestamp" when they first access a Resource. The Safe Timestamp Manager also stores the state in commit processing for each committing transaction, and stores the safe timestamp for transactions that have committed. It also stores the highest allocated commit timestamp, and each committing transaction is allocated its own unique timestamp. Storage area 1, 2, . . . N store entries and their generations. The storage areas can themselves prepare and commit, so act as RMs in the 2PC approach. Entries are spread intelligently across the storage areas so that one given entry and all its generations are stored in one and only one storage area.

Figure 12:
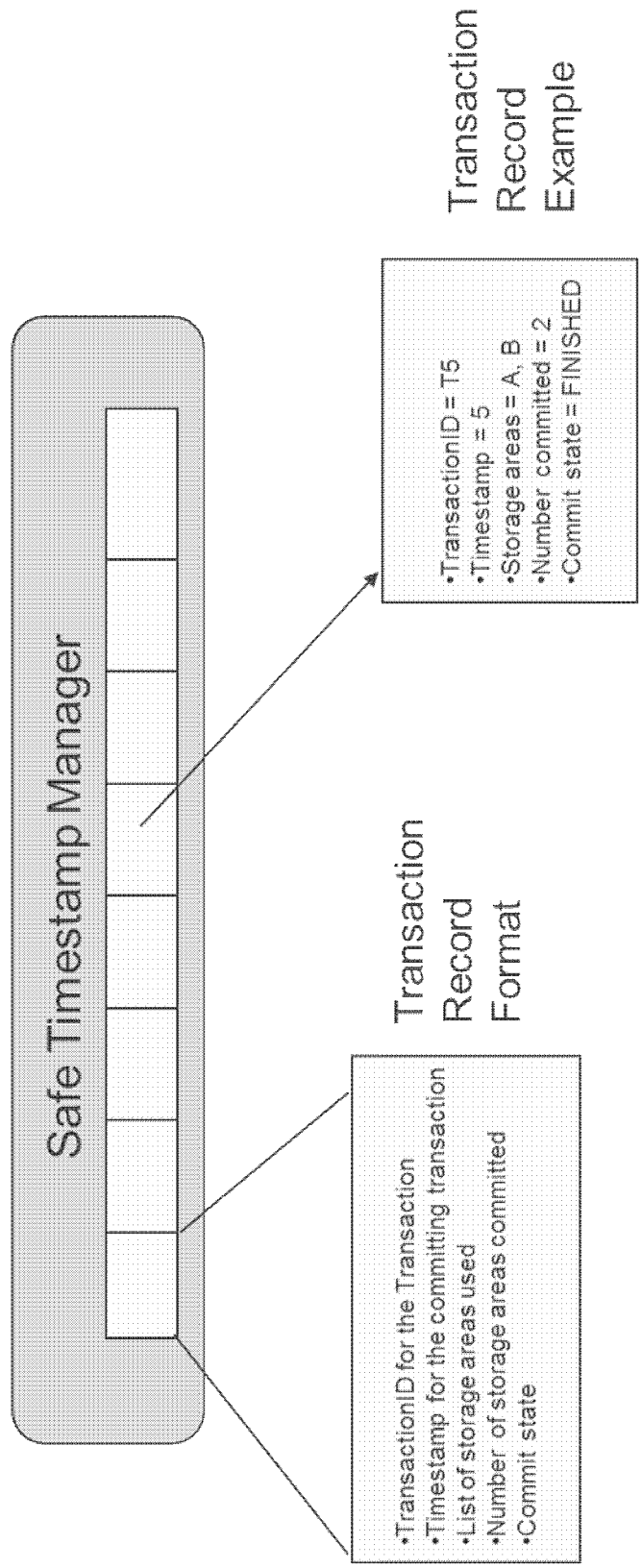
FIG. 12 further illustrates the Safe Timestamp Manager of FIG. 11.

Moreover, a new commit protocol is used, as illustrated in FIG. 12. The Safe Timestamp Manager stores a transaction record for each transaction. The transaction record may be formatted to have five attributes:

i) a transaction identifier for the transaction
  ii) the unique timestamp allocated to the committing transaction
  iii) a list of storage areas used by the transaction iv) the number of storage areas that have been committed v) the status of the committing of the transaction (i.e. Commit State in the transaction record format)

The Commit State may be one of:

a) Unallocated—slot is not used b) Pending—the transaction has started to commit, but some RMs have not completed committing c) Finished—all changes to entries in the storage areas resulting from the transaction have been committed, and the transaction is complete For example, a typical transaction record may be:

i) TransactionID=T5 ii) Timestamp=5 iii) Storage areas=1, 2 iv) Number committed=2 v) Commit state=FINISHED.

Figure 13:
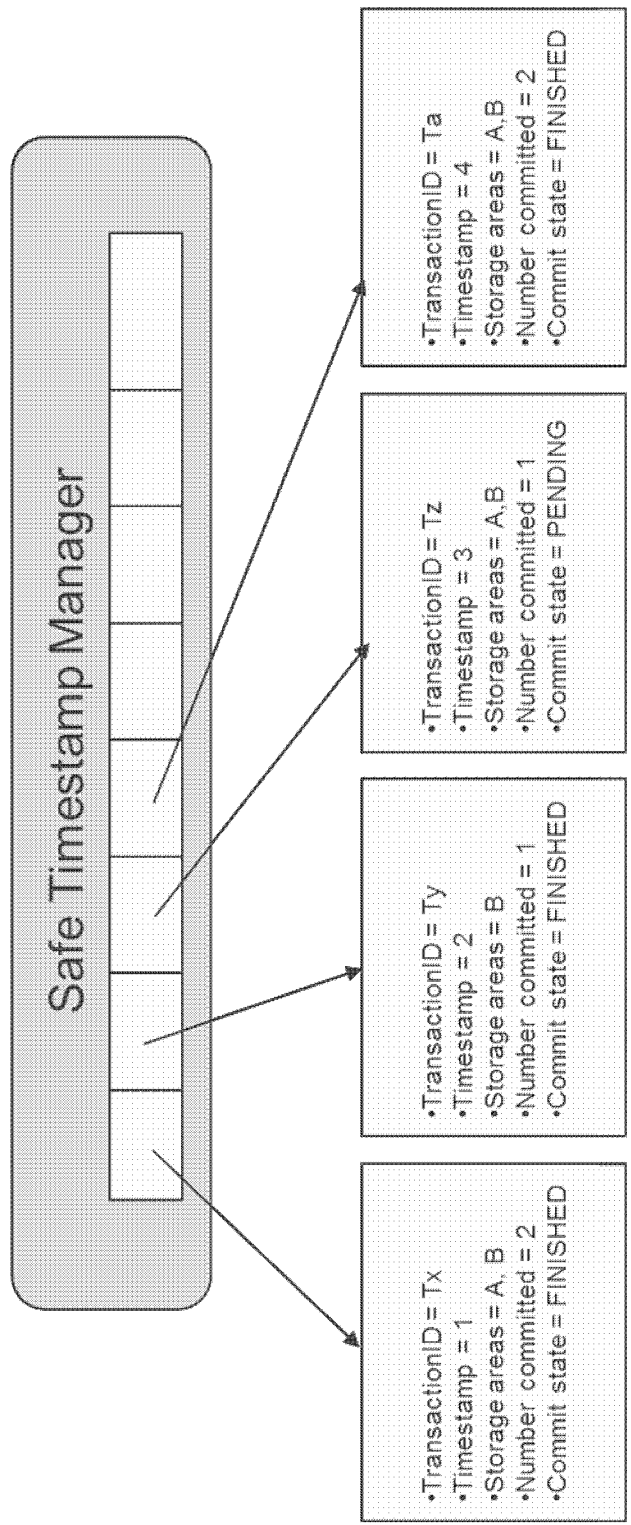
FIG. 13 shows an example of a Safe Timestamp Manager with four transaction records.

FIG. 13 shows a specific example illustrating how a Safe Timestamp may be defined. The Safe Timestamp Manager in this example stores four transaction records:

1) TransactionID=Tx
Timestamp=1
Storage areas=1, 2
Number committed=2
Commit state=FINISHED 2) TransactionID=Ty
Timestamp=2
Storage areas=2
Number committed=1
Commit state=FINISHED 3) TransactionID=Tz
Timestamp=3
Storage areas=1, 2
Number committed=1
Commit state=PENDING 4) TransactionID=Ta
Timestamp=4
Storage areas=1, 2
Number committed=2
Commit state=FINISHED Given that timestamps are a monotonically increasing sequence, the safe timestamp is defined as the highest timestamp where all transactions with timestamps less than or equal to its value have FINISHED. Each transaction is assigned a unique timestamp as it begins commit processing.

In the present example, transactions 1), 2) and 4) with respective timestamps 1, 2 and 4 are FINISHED, and transaction 3) with timestamp 3 is PENDING. The transaction with timestamp 3 is PENDING because there are two storage areas accessed by this transaction, but only one of two has committed. Therefore the safe timestamp that is handed out to new client transactions is 2 (the highest timestamp where all transactions with timestamps less than or equal to its value have FINISHED). This means that new client transactions are given a visibility of Timestamp=2, and do not observe any changes made by transactions 3) and 4). When transaction 3) with timestamp 3 is FINISHED, the safe timestamp will become 4.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of processing transactions requested by an application in a distributed computer system comprising:

at least one resource comprising a plurality of storage areas, or a plurality of resources each comprising at least one storage area, in each case wherein the storage areas hold tables including a content, wherein the storage areas hold the same tables as each other, and wherein each storage area has an associated resource manager;

a transaction manager that is linked, by way of a network or a local application programming interface (API), to each of the resource managers, the transaction manager being configured to coordinate transaction prepare and commit cycles;

wherein the application requests operations on the resources by way of an interface;

wherein a dispatch function directs the transactions from the application to the appropriate storage area or storage areas on the basis of the content of the tables in the storage areas, in such a way that any given transaction is routed only to the storage areas containing entries upon which the transaction operates, allowing another transaction operating on different entries to be routed concurrently in parallel to other storage areas;

wherein a safe timestamp manager is provided to allocate new timestamps for committing the transactions in a single order;

wherein new transactions requested by the application are assigned a most current safe timestamp when they first access a resource, wherein the safe timestamp is defined as a highest timestamp where all the transactions with timestamps less than or equal to the safe timestamp have been completed; and wherein the safe timestamp manager hands out the current safe timestamp when the transaction requested by the application first accesses the resource, and wherein handing out the current safe timestamp is a read-only operation such that concurrent transactions do not need to lock against each other in order to obtain the current value of the safe timestamp.

2. The method according to claim 1, wherein the interface by which the application requests operations on the resource takes the form of a client API, and/or a query language, and/or a protocol.

3. The method according to claim 1, wherein each of the transactions is assigned a unique timestamp by the safe timestamp manager as it begins processing.

4. The method according to claim 3, wherein the safe timestamp is increased as the transactions are completed.

5. The method according to claim 1, wherein the safe timestamp manager stores the state in commit processing (the transaction commit state) for each committing transaction, and stores the safe timestamp for the transactions that have committed.

6. The method according to claim 5, wherein the safe timestamp manager stores the highest allocated commit timestamp, and each committing transaction is assigned its own unique timestamp.

7. The method according to claim 1, wherein the storage areas in the resource are used to store table entries and their generations, and wherein the entries are spread across the storage areas in such a way that any given entry and all its generations are stored in one and only one storage area.

8. The method according to claim 1, wherein the dispatch function is part of the resource.

9. The method according to claim 1, wherein the dispatch function is part of the application.

10. The method according to claim 1, wherein the dispatch function resides between the resource and the application.

11. The method according to claim 1, wherein the dispatch function implements an application programming interface (API) or protocol that is used by the application.

12. The method according to claim 11, wherein the dispatch function and the individual resource managers use the same API or protocol.

13. The method according to claim 1, wherein the dispatch function finds the resource manager to use for any given transaction by taking a hash-code of an entry's Primary Key or other unique identifier modulo a number of resource managers.

14. The method according claim 1, wherein an entry is inserted into a particular resource based on its own identifier, and also based on application-specific information made available to the dispatch function at runtime.

15. The method according to claim 14, wherein the application-specific information is encoded into an entry identifier.

16. The method according to claim 14, wherein the application-specific information is provided as meta data for the entry.

17. The method according to claim 1, wherein the safe timestamp manager creates and stores a transaction record for each transaction.

18. The method according to claim 17, wherein the transaction record is formatted to have five attributes:
i) a transaction identifier for the transaction
ii) the unique timestamp allocated to the committing transaction
iii) a list of storage areas used by the transaction
iv) the number of storage areas that have been committed
v) the commit status of the transaction.

19. The method according to claim 1, wherein each storage area acts as a single resource manager and each storage area/resource manager is informed to commit by the transaction manager.

20. The method according to claim 19, wherein, as part of a commit operation, a storage area/resource manager puts together its own commit message, and wherein the commit message is transmitted via a network protocol to any other resource manager that is involved in the transaction, the protocol being defined by the resource manager.

21. The method according to claim 20, wherein each storage area has its own independent Total Order, such that commit messages for different storage areas are received and processed in different Total Orders.

22. The method according to claim 20, wherein the commit message contains a transaction identifier, the storage area represented by the resource manager and the total number of storage areas used in the transaction.

23. The method according to claim 20, wherein multiple commit messages are generated for a transaction if the transaction has updated multiple storage areas/resource managers.

24. The method according to claim 23, wherein the multiple commit messages are sent in parallel and/or processed in parallel.

25. A distributed computer system comprising:
at least one resource comprising a plurality of storage areas, or a plurality of resources each comprising at least one storage area, each case wherein the storage areas hold tables including a content, wherein the storage areas hold the same tables as each other, and wherein each storage area has an associated resource manager;
a transaction manager that is linked, by way of a network or a local application programming interface (API), to each of the resource managers, the transaction manager being configured to coordinate transaction prepare and commit cycles;
an interface to allow an application to request operations on the resources;
a dispatch function to direct transactions from the application to the appropriate storage area or storage areas on the basis of the content of the tables in the storage areas, in such a way that any given transaction is routed only to the storage areas containing entries upon which the transaction operates, allowing another transaction operating on different entries to be routed concurrently in parallel to other storage areas;
a safe timestamp manager is to allocate new timestamps for committing the transactions in a single order;
wherein the safe timestamp manager is configured to assign a most current safe timestamp to new transactions requested by the application when they first access a resource, wherein the safe timestamp is defined as a highest timestamp where all the transactions with timestamps less than or equal to the safe timestamp have been completed; and
wherein the safe timestamp manager is configured to hand out the current safe timestamp when the transaction requested by the application first accesses the resource, and wherein handing out the current safe timestamp is a read-only operation such that concurrent transactions do not need to lock against each other in order to obtain the current value of the safe timestamp.

26. The system according to claim 25, wherein the interface by which the application requests operations on the resource takes the form of a client API, and/or a query language, and/or a protocol.

27. The system according to claim 25, wherein the safe timestamp manager is configured to assign a unique timestamp to each of the transactions as it begins processing.

28. The system according to claim 27, wherein the safe timestamp is increased as the transactions are completed.

29. The system according to claim 25, wherein the safe timestamp manager is configured to store the state in commit processing for each committing transaction, and to store the safe timestamp for the transactions that have committed.

30. The system according to claim 29, wherein the safe timestamp manager is configured to store the highest allocated commit timestamp, and each committing transaction is assigned its own unique timestamp.

31. The system according to claim 25, wherein the storage areas in the resource are configured to store table entries and their generations, and wherein the entries are spread across the storage areas in such a way that any given entry and all its generations are stored in one and only one storage area.

32. The system according to claim 25, wherein the dispatch function is part of the resource.

33. The system according to claim 25, wherein the dispatch function is part of the application.

34. The system according to claim 25, wherein the dispatch function resides between the resource and the application.

35. The system according to claim 25, wherein the dispatch function is configured to implement an application programming interface (API) or protocol that is used by the application.

36. The system according to claim 35, wherein the dispatch function and the individual resource managers are configured to use the same API or protocol.

37. The system according to claim 25, wherein the dispatch function is configured to find the resource manager to use for any given transaction by taking a hash-code of an entry's Primary Key or other unique identifier modulo a number of resource managers.

38. The system according to claim 25, configured such that an entry is inserted into a particular resource manager based on its own identifier, and also based on application-specific information made available to the dispatch function at runtime.

39. The system according to claim 38, configured such that the application-specific information is encoded into an entry identifier.

40. The system according to claim 38, configured such that the application-specific information is provided as meta data for the entry.

41. The system according to claim 25, wherein the safe timestamp manager is configured to create and store a transaction record for each transaction.

42. The system according to claim 41, wherein the transaction record is formatted to have five attributes:
   i) a transaction identifier for the transaction
   ii) the unique timestamp allocated to the committing transaction
   iii) a list of storage areas used by the transaction
   iv) the number of storage areas that have been committed
   v) the commit status of the transaction.

43. The system according to claim 25, wherein each storage area is configured to act as a single resource manager and each storage area/resource manager is informed to commit by the transaction manager.

44. The system according to claim 43, wherein a storage area/resource manager is configured to put together its own commit message as part of a commit operation, and wherein the commit message is transmitted via a network protocol to any other resource manager that is involved in the transaction, the protocol being defined by the resource manager.

45. The system according to claim 44, wherein each storage area has its own independent total order, such that commit messages for different storage areas are received and processed in different total orders.

46. The system according to claim 44, wherein the commit message contains a transaction identifier, the storage area represented by the resource manager and the total number of storage areas used in the transaction.

47. The system according to claim 44, configured such that multiple commit messages are generated for a transaction if the transaction has updated multiple storage areas/resource managers.

48. The system according to claim 47, configured such that the multiple commit messages are sent in parallel and/or processed in parallel.

* * * * *